US009565111B2

(12) United States Patent
Vasseur et al.

(10) Patent No.: US 9,565,111 B2
(45) Date of Patent: Feb. 7, 2017

(54) MIXED CENTRALIZED/DISTRIBUTED ALGORITHM FOR RISK MITIGATION IN SPARSELY CONNECTED NETWORKS

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 153 days.

(21) Appl. No.: 13/953,040

(22) Filed: Jul. 29, 2013

(65) Prior Publication Data

US 2014/0219103 A1 Aug. 7, 2014

Related U.S. Application Data

(60) Provisional application No. 61/761,102, filed on Feb. 5, 2013.

(51) Int. Cl.
*H04L 12/803* (2013.01)
*H04L 12/729* (2013.01)
*H04L 12/721* (2013.01)

(52) U.S. Cl.
CPC ........... *H04L 47/122* (2013.01); *H04L 45/125* (2013.01); *H04L 45/127* (2013.01)

(58) Field of Classification Search
CPC ..... H04L 45/125; H04L 45/127; H04L 47/122
See application file for complete search history.

(56) References Cited

U.S. PATENT DOCUMENTS

| 7,693,064 | B2 * | 4/2010 | Thubert | ................ H04L 43/022 370/235 |
|---|---|---|---|---|
| 8,374,092 | B2 | 2/2013 | Previdi et al. | |
| 8,406,153 | B2 | 3/2013 | Vasseur et al. | |
| 8,447,849 | B2 | 5/2013 | Shaffer et al. | |
| 2003/0158965 | A1 * | 8/2003 | Koester | .......................... 709/239 |

(Continued)

FOREIGN PATENT DOCUMENTS

EP 1195952 4/2002

OTHER PUBLICATIONS

"A QoS Adaptive Congestion Control in Wireless Sensor Networks", Rahman et al, IEEE, 2008.*

(Continued)

*Primary Examiner* — Habte Mered
(74) *Attorney, Agent, or Firm* — Parker Ibrahim & Berg LLC; James M. Behmke; Stephen D. LeBarron

(57) ABSTRACT

In one embodiment, techniques are shown and described relating to a mixed centralized/distributed algorithm for risk mitigation in sparsely connected networks. In particular, in one embodiment, a management node determines one or more weak point nodes in a shared-media communication network, where a weak point node is a node traversed by a relatively high amount of traffic as compared to other nodes in the network. In response to determining that a portion of the traffic can be routed over an alternate acceptable node, the management node instructs the portion of traffic to reroute over the alternate acceptable node.

22 Claims, 10 Drawing Sheets

(56) References Cited

U.S. PATENT DOCUMENTS

| | | | | |
|---|---|---|---|---|
| 2007/0121673 | A1* | 5/2007 | Hammer | H04L 41/026 370/468 |
| 2007/0147378 | A1* | 6/2007 | Elgebaly | H04L 63/0272 370/392 |
| 2009/0232001 | A1* | 9/2009 | Gong | H04L 47/10 370/236 |
| 2010/0125674 | A1* | 5/2010 | Vasseur et al. | 709/240 |
| 2011/0231573 | A1* | 9/2011 | Vasseur | H04L 45/48 709/238 |
| 2011/0299389 | A1* | 12/2011 | Mau | H04L 47/11 370/230 |
| 2012/0155276 | A1 | 6/2012 | Vasseur et al. | |
| 2012/0213124 | A1 | 8/2012 | Vasseur et al. | |
| 2013/0016612 | A1 | 1/2013 | Vasseur et al. | |
| 2014/0204759 | A1* | 7/2014 | Guo | H04W 28/0236 370/236 |

OTHER PUBLICATIONS

Lafitte-De Jong, et al., "Notification of Transmittal of the International Search Report and the Written Opinion of the International Searching Authority, or the Declaration", Patent Cooperation Treaty, International Appl. No. PCT/US2014/014709, mailed May 26, 2014, 11 pages, European Patent Office, Rijswijk, Netherlands.

Sahoo, et al., "An OSPF Based Load Sensitive QoS Routing Algorithm Using Alternate Paths", 11th International Conference on Computer Communications and Networks, Oct. 2002, pp. 236-241, IEEE, Piscataway, NJ.

Vasseur, et al., "A Mixed Centralized/Distributed Algorithm for Risk Mitigation in Sparsely Connected Networks", U.S. Appl. No. 61/176,702, filed Feb. 5, 2013, 28 pages, U.S. Patent and Trademark Office.

Winter, et al., "RPL: IPv6 Routing Protocol for Low-Power and Lossy Networks", Request for Comments 6550, Mar. 2012, 157 pages, Internet Engineering Task Force Trust.

* cited by examiner

MIXED CENTRALIZED/DISTRIBUTED ALGORITHM FOR RISK MITIGATION IN SPARSELY CONNECTED NETWORKS

RELATED APPLICATION

The present invention claims priority to U.S. Provisional Application Ser. No. 61/761,102, filed Feb. 5, 2013, entitled "A MIXED CENTRALIZED/DISTRIBUTED ALGORITHM FOR RISK MITIGATION IN SPARSELY CONNECTED NETWORKS", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
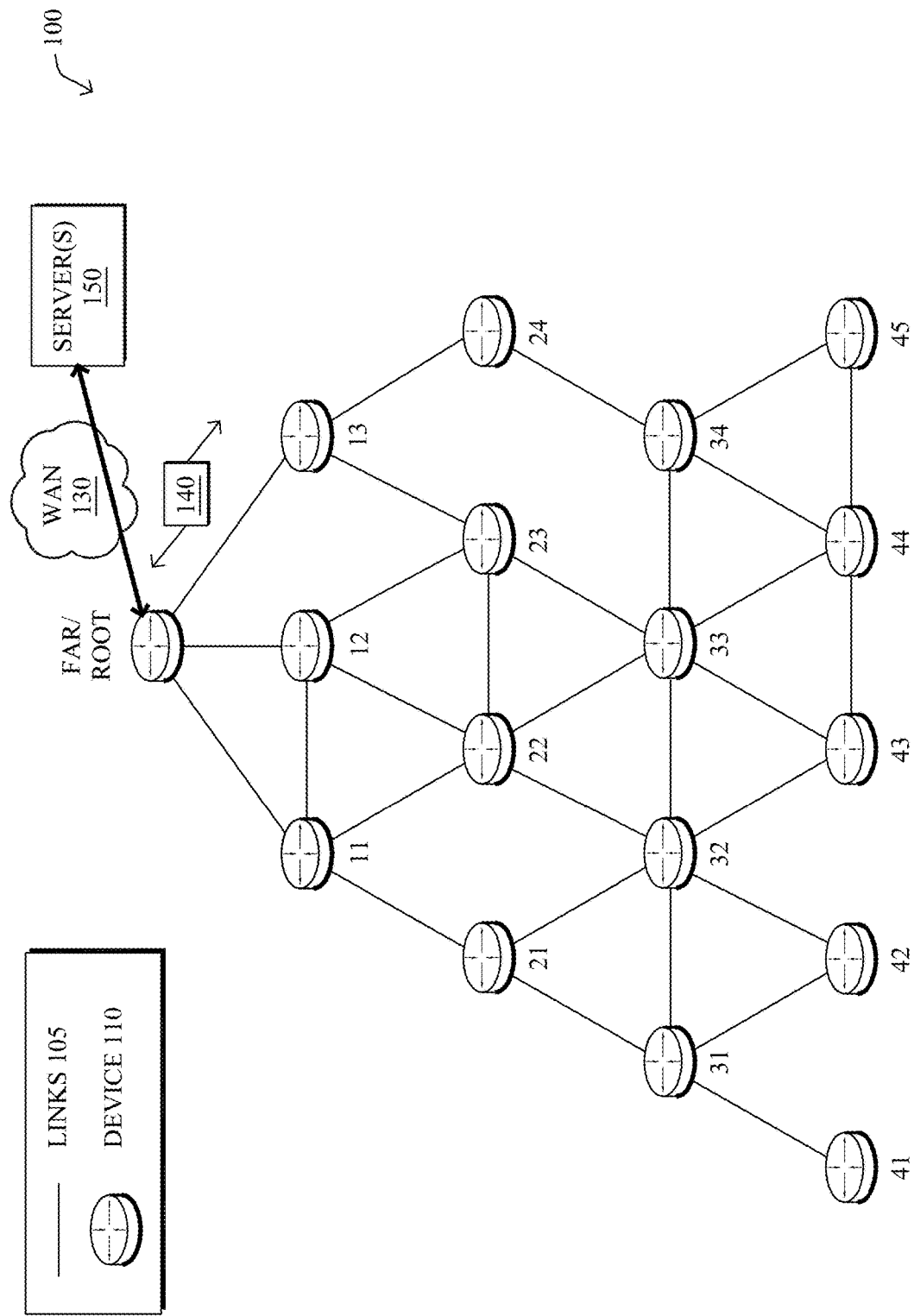
FIG. 1 illustrates an example communication network.

According to one or more embodiments of the disclosure, techniques are shown and described relating to a mixed centralized/distributed algorithm for risk mitigation in sparsely connected networks. In particular, in one embodiment, a management node determines one or more weak point nodes in a shared-media communication network, where a weak point node is a node traversed by a relatively high amount of traffic as compared to other nodes in the network. In response to determining that a portion of the traffic can be routed over an alternate acceptable node, the management node instructs the portion of traffic to reroute over the alternate acceptable node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
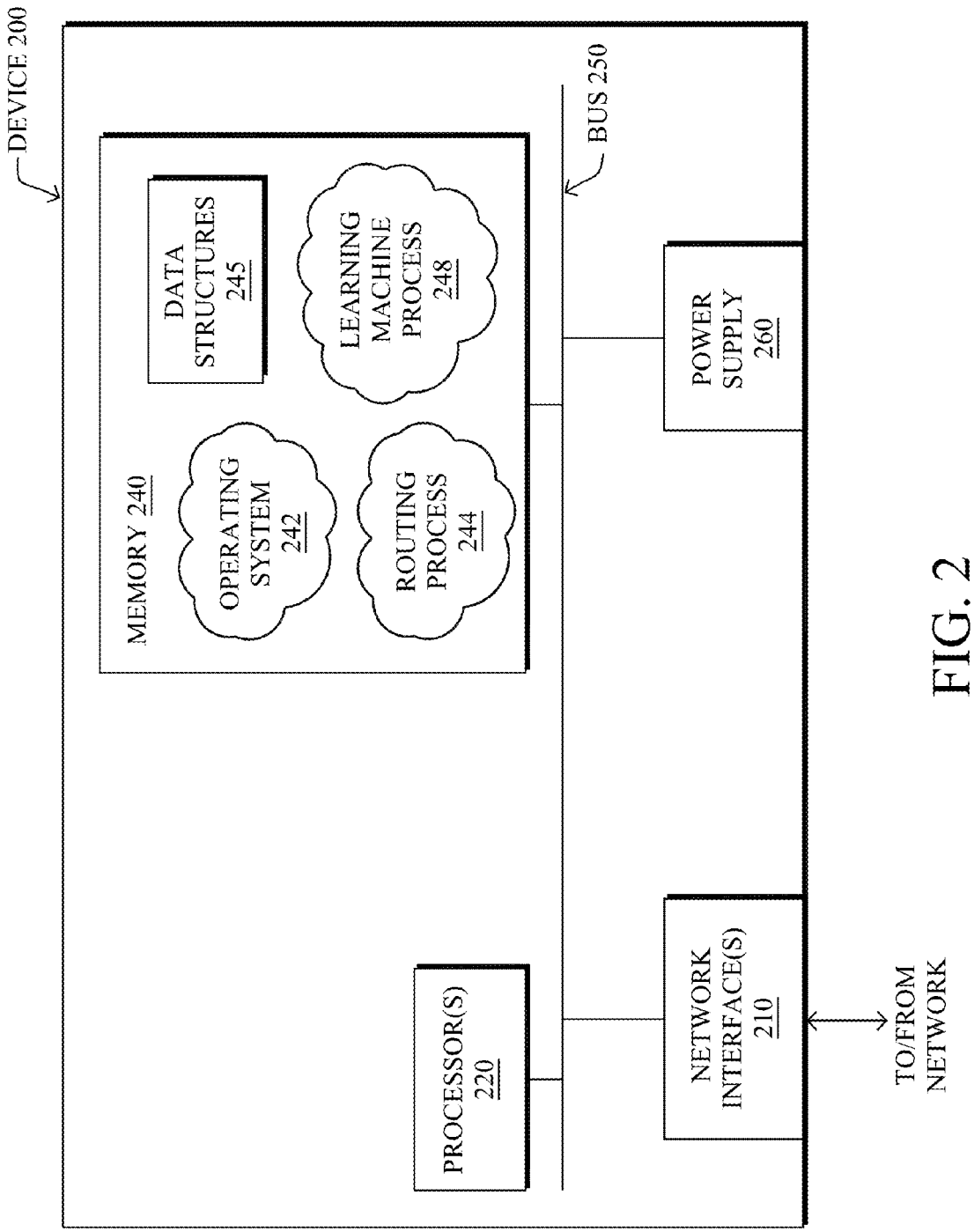
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
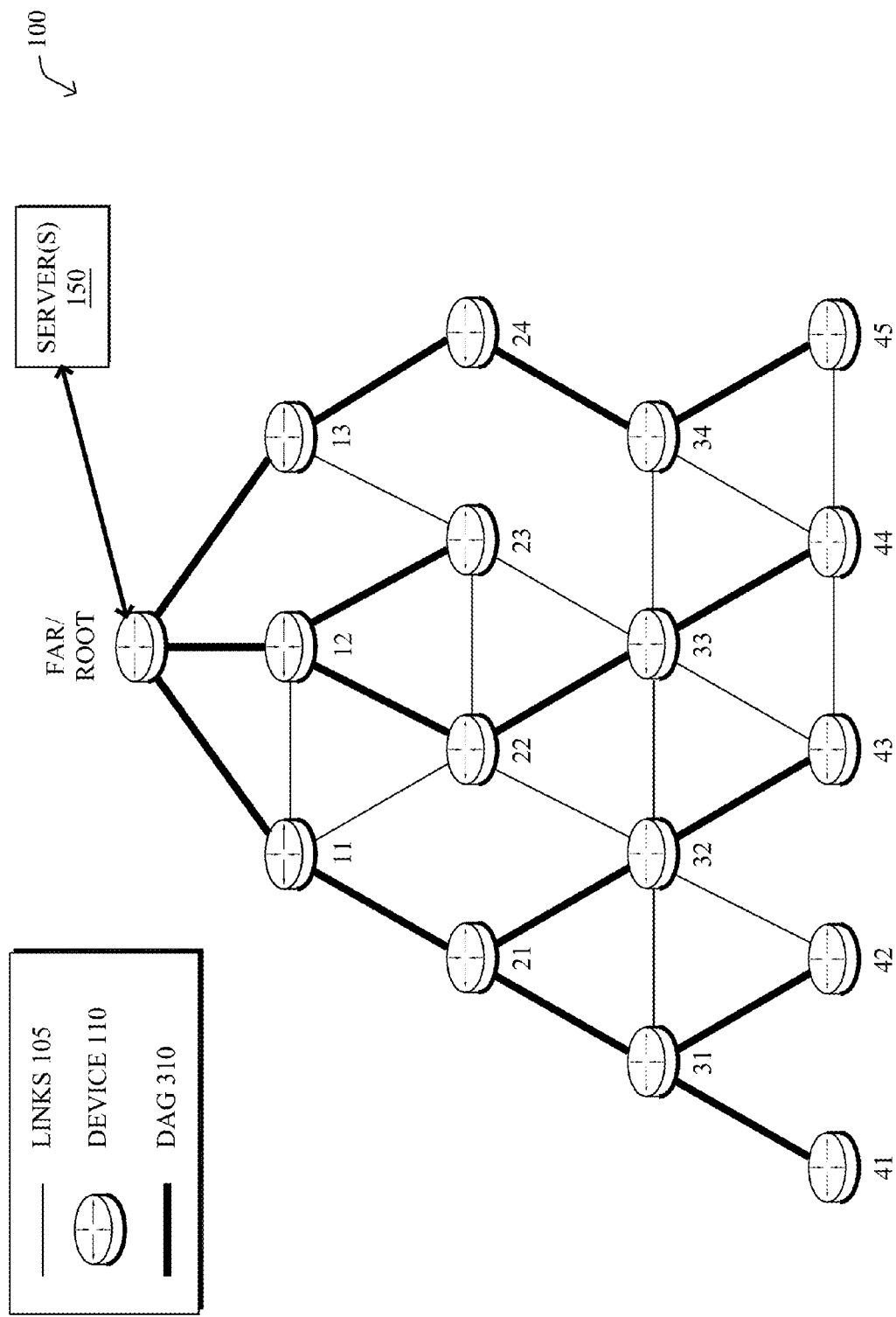
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

One of the key factors in large scale deployments is the existence of "weak" points, where a weak point is defined as a router in the routing topology that carries "important" traffic (defined below) and attracts a majority of traffic (even though an alternate path may exist that would still meet the SLA requirement), and the failure of which results in major disconnectivity in the routing topology and/or impact on critical traffic.

Figure 4:
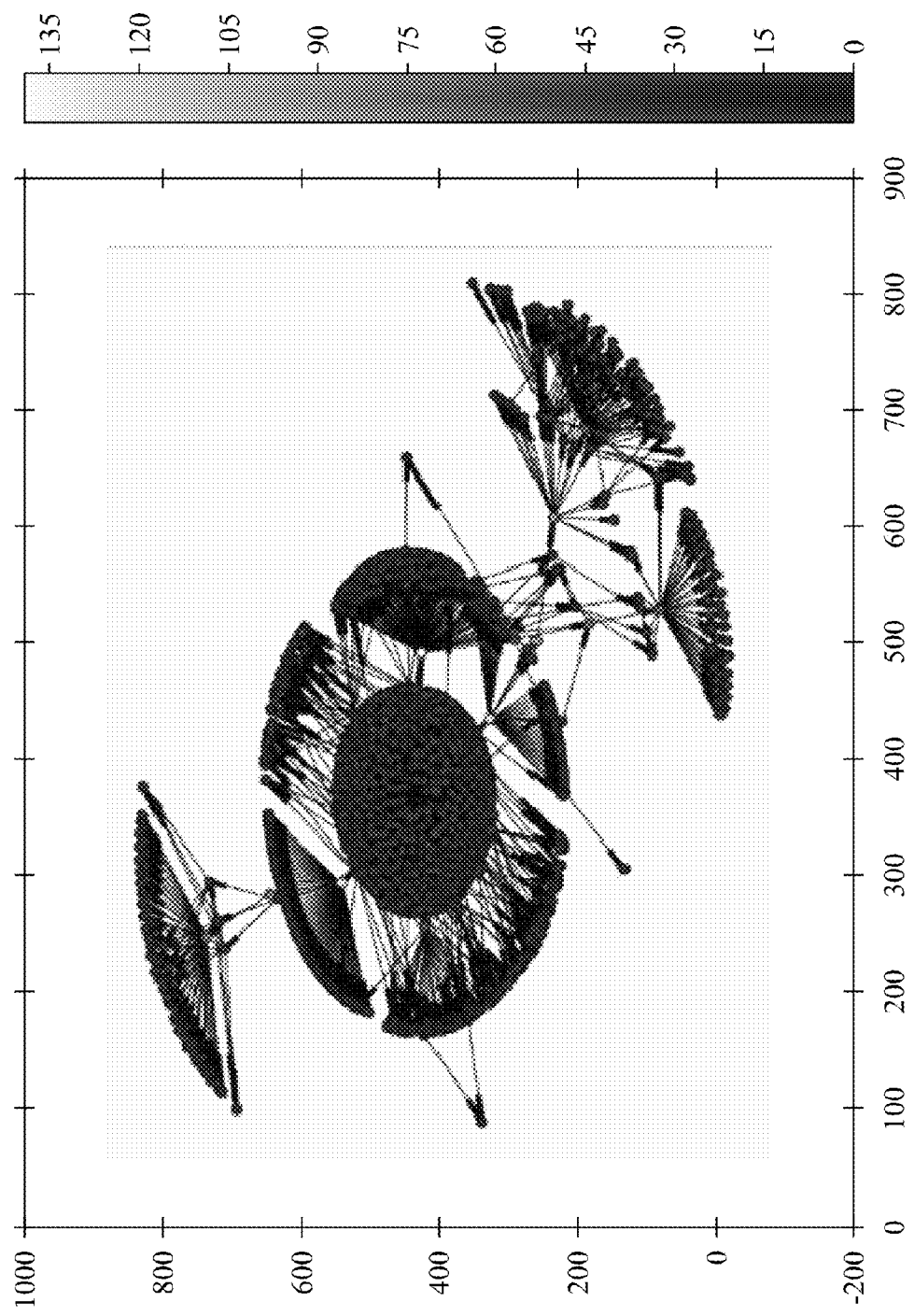
FIG. 4 illustrates an example alternative view of a network showing parents, children, and siblings.

The graph shown in FIG. 4 clearly describes such a phenomena in a deployed network: it results from the aggregation (super imposition) of 60 RPL DAGs obtained in a 1-hour experiment (one snapshot per minute). The shading code indicates the average number of children of a given node. It appears that some specific nodes have a very large number of children (e.g., more than 135 in this case), while others have few or none.

Figure 5:
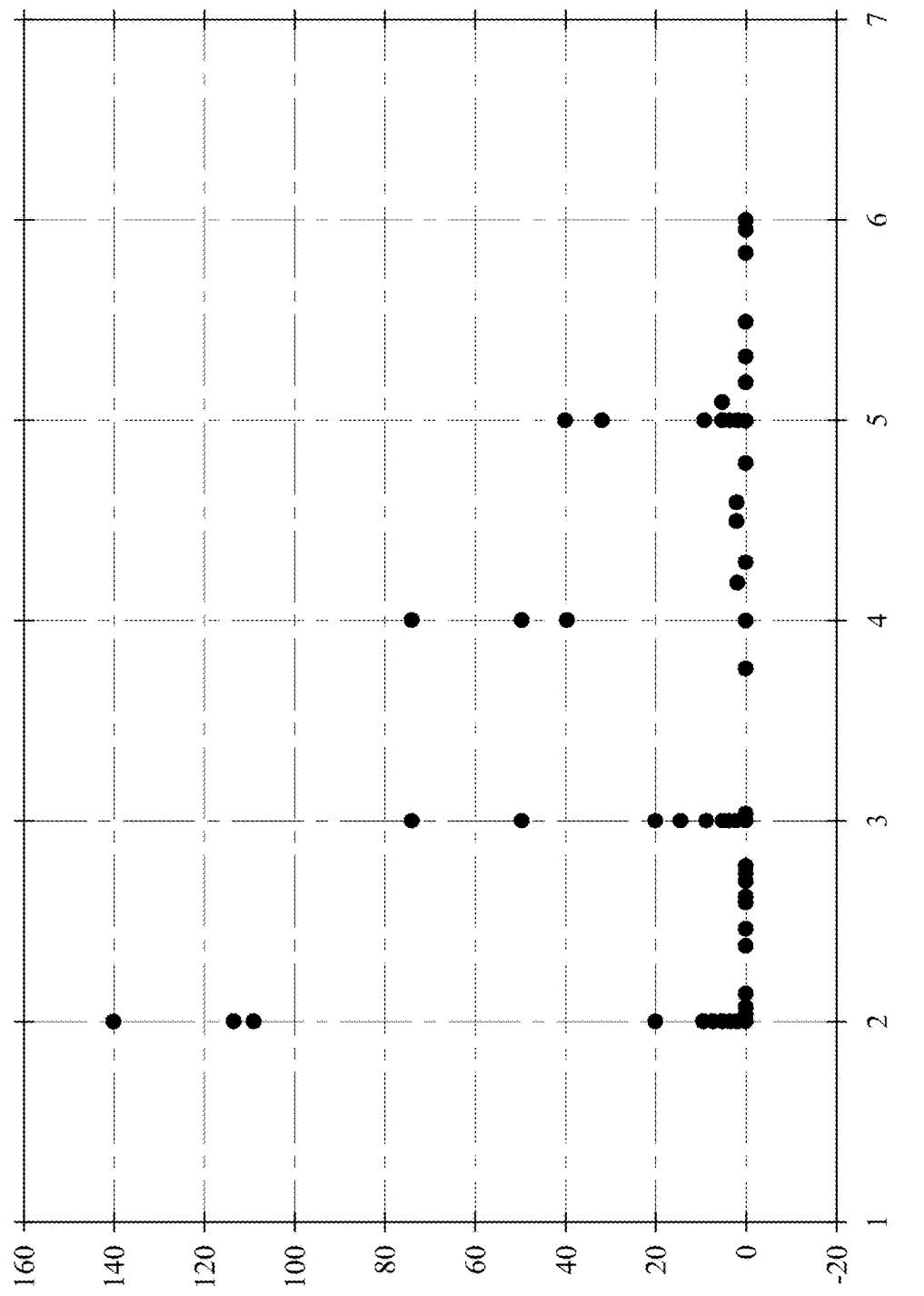
FIG. 5 illustrates an example of a number of children per node rank within a network.

When looking at the relationship between the rank and the number of children for the same dataset (see FIG. 5), it appears quite clearly that even nodes that have a large rank (that is, that are far from the root) can have a large number of children in average, thereby indicating that they play a critical role for routing both up-stream and down-stream traffic; this is a very important fact (since for node closer to the root it is expected to have a large number of children).

By contrast with "classic" wired IP networks, weak points are extremely undesirable in LLNs and severely weaken the robustness of the network. First, nodes in LLNs do fail and Non-Stop Forwarding (NSF) is not available on highly constrained devices. Thus, the consequences of a node failure in a LLN may be dramatic, possibly leading to a lack of connectivity (which is rarely the case with high-end routers where a number of technologies such as NSF, Fast Reroute (FRR), and Graceful Restart (GR) are available). Second, the presence of weak points is quite undesirable considering that the convergence time of routing protocols in LLN is very significant (again by contrast with ISIS/OSPF that provide convergence time of the order of a few dozen of milliseconds). As a result, the impact of a weak point failure may be dramatic in such networks. Third, when such nodes are battery-operated or make use of energy scavengers, the convergence of a vast amount of traffic would deplete the energy available of the node very rapidly.

The only available strategy with current protocols consists of the routing protocol "blindly" balancing traffic across a set of paths (for example, using an additional metric where a node would also advertise its number of children or some other metric that characterizes the properties of its sub-DAG.). Unfortunately, such a routing strategy has the following undesirable implications:

1) Load balancing is not always possible since, in most cases, a router would have to make use of symmetrical load balancing to avoid the well-known looping issue;
2) Even when asymmetrical load balancing is technically feasible, the traffic would then follow longer path than necessary since all nodes would balance the load, thereby implying for some traffic to follow a non-optimal path even if the node may have chosen a preferable next hop (since a node does not know whether or not the preferred next hop in terms of path cost is a weak point). Indeed using techniques to load balance the DAG would unavoidably lead to unpredictable path qualities (a very well-known and undesirable issue), thus referring to the load balancing as "blind" as above.

Said differently, load balancing would have to be performed blindly since nodes operating according to distributed distance vector (DV) routing protocols such as RPL do not have a full knowledge of the topology, and therefore cannot identify whether their preferred next hop is a weak point with current technologies; that is, their routing decision is solely based on routing metrics and objective function.

The techniques herein, therefore, address this issue by identifying weak points using an off-line routing analysis engine, and triggering local action where needed to avoid the presence of weak points in these networks. In particular, the techniques herein specify a network topology analysis engine hosted on the Field Area Router (FAR) (or other management node, such as an NMS) responsible for detecting weak points in the routing topology that has been formed by the distributed routing protocol. Once a weak point is identified based on traffic analysis and a routing database, a distributed algorithm is triggered on a set of nodes to smoothly perform next hop changes and start applying local routing topology change using the distributed routing approach with new constraints driven by the routing topology engine. The algorithm stops when the informed weak node determines that a high enough number of children have moved away and the node is no longer a weak point. Notably, by introducing a new characteristic for computing a (constrained) shortest path routing topology, i.e., weak points, which may be centrally detected using a learning machine (considering the number of input variables that are taken into account), and by using a distributed algorithm for corrective measures, it is possible to ensure paths within the routing topology that avoid/reduce the weak points and that satisfy the SLAs.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Operationally, the techniques herein analyze the routing topology using distributed intelligence hosted on the Field Area Router (FAR) (or other management device) computed by the distributed routing protocol in order to identify weak points. As pointed out above, a weak point may be defined herein as a node that is traversed by a large amount of "important" traffic where alternative paths exist to avoid selecting the weak point.

In networks using RPL as their routing protocol, the DAG root has a complete visibility of the DAG (thanks to the collection of DAO messages); other protocols including RPL non-storing mode make use of various other techniques to gather the routing topology. Furthermore, since most (e.g., all) traffic from devices in the LLN typically traverses the DAG root, deep packet inspection (DPI) or traffic sampling is used by the FAR (inspecting the IP source and destination address) so as to determine the amount of traffic traversing each node in the network. Other techniques for computation of traffic matrix may also be used in place of DPI. In another embodiment, the "amount" of traffic of a particular weak point node may be based on a number of children (e.g., and grandchildren, etc.) of the particular weak point node in a DAG.

Thus, the techniques herein determine at the DAG root the set S of weak points in the network, where S is the collection of nodes that satisfy the following criteria:

1) Nodes that are not in the immediate neighborhood of DAG root and still attract a large amount of traffic (i.e., at least a certain depth/rank away from a root node); and
2) The traffic traversing the node is considered/classified as important (e.g., determined based on a traffic type, a traffic class, traffic with a specific differentiated services code point (DSCP) value, IP destination address of the traffic, etc.).

Because these criteria may vary from network to network, and as a function of the networking conditions, a Learning Machine may be used for detecting these weak points. For instance, the techniques may use an anomaly detection algorithm, which operates on three features: the number of children, the hop count, and the amount of important traffic traversing the node. The techniques herein may model the distribution of the ensemble of nodes in this three-dimensional state space using an appropriate distribution $P(x_i|\epsilon)$ (e.g., Gaussian) where $x_i$ is the 3-dimensional vector of properties for node i and $\epsilon$ is the vector of parameters of the distribution. The optimal vector $\epsilon$ (i.e., the one for which $P(x|\epsilon)$ best fits the empirical data) may be found using standard methods for robust estimation. Then, the techniques may use the resulting distribution to find weak points, which are those nodes $n_i$ whose probability $P(x_i|\epsilon)$ is lower than a given (user-defined) threshold T.

Figure 6:
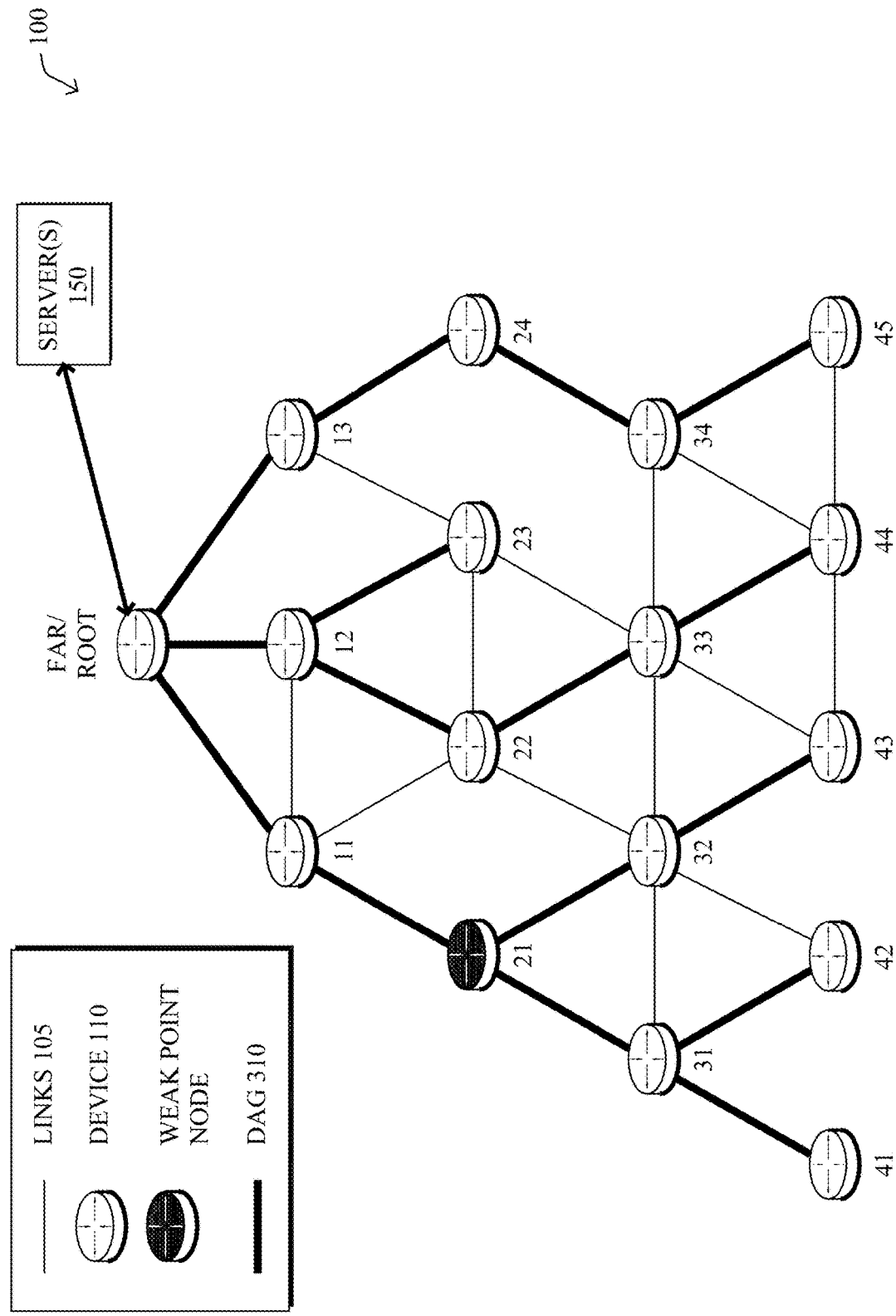
FIG. 6 illustrates an example of a weak point node.

As shown in the simplified example of FIG. 6, assume that node 21 is identified as a weak point, based on any one or more of the factors noted above (e.g., a high amount of important traffic, a certain depth/rank away from the root, etc.).

Figure 7:
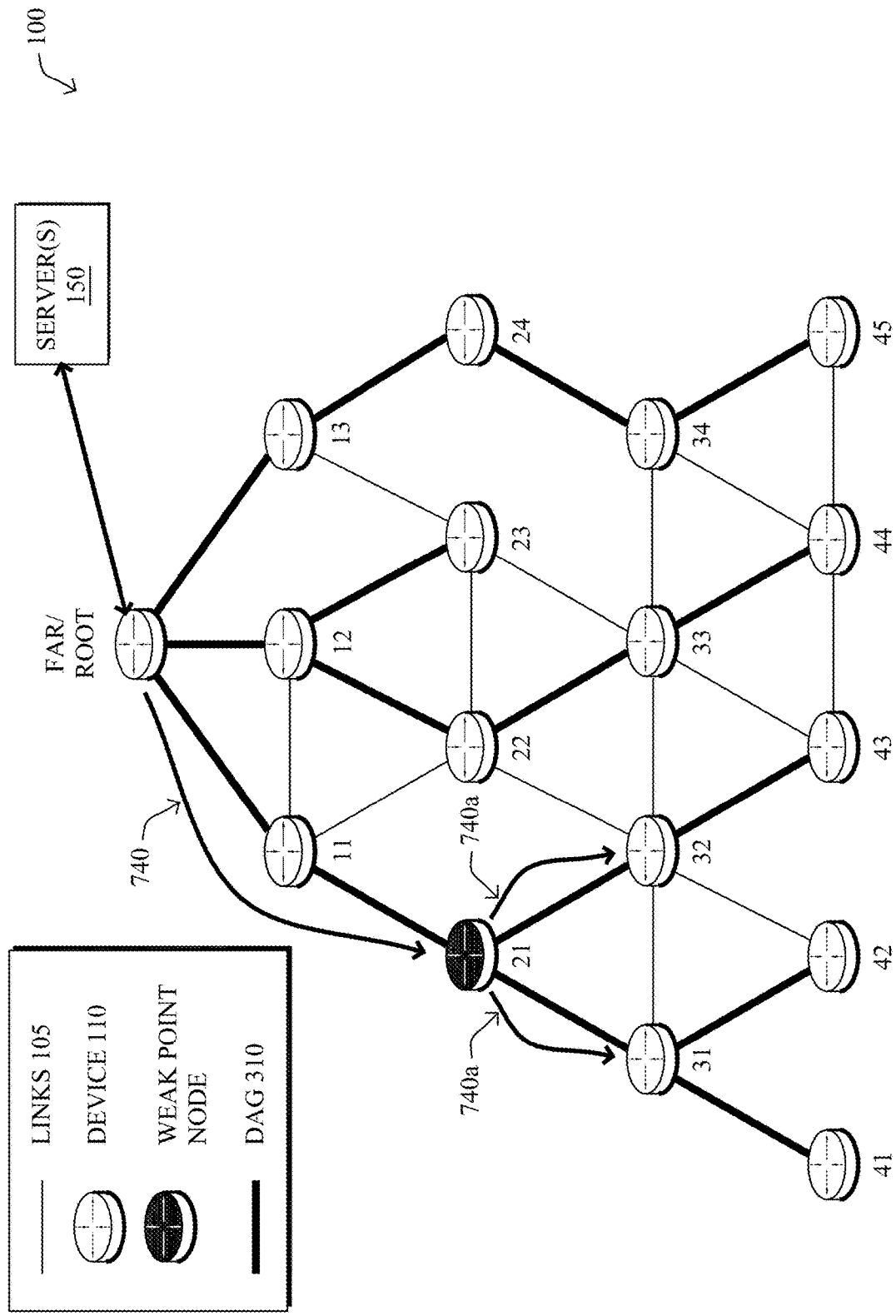
FIG. 7 illustrates an example of a probe message for weak point nodes.

A second aspect of the techniques herein determines whether local actions can be triggered in specific areas of the network (by contrast with a systematic blind load balancing approach) so as to avoid weak points. To that end, the techniques herein specify an algorithm (e.g., central) that could be used by a network topology analysis component on the Field Area Router or the NMS that consists of polling each node in the set S of weak nodes in order to determine whether or not alternate acceptable next-hops exist for a subset of their children in the DAG. Should some of the alternate next hops be known by the routing topology analysis agent (for example with RPL a node can report its current next hop in addition to potential backup along with their respective cost), the engine may be capable of finding an alternate path in order to apply a local fix, thus removing nodes from the S list. Illustratively, for example, as shown in the simplified example of FIG. 7, the management device (e.g., FAR) may send probes 740 (740a) to the children of the weak point node (e.g., nodes 31 and 32) to determine whether any alternate paths exist.

Note that alternate paths for children of weak points are candidates if and only if the new next-hop does not become a weak point (a condition quite difficult to achieve when using a distributed approach whereby non-coordinated decisions may lead to moving the weaknesses to another node in the network). For instance, node 32 may have an alternate path to node 22, however node 22 may then become a weak point as well.

In addition, the DAG root computes the maximum number of number children that a node (potential new parent) in the neighborhood of the weak point can accept in its sub-DAG before becoming a weak point itself. It may take into account historical trends, current ETX values, flappiness, and stickiness values of the sub-DAG nodes when it makes this decision. As described above, this is to avoid a notified node of the set S to redirect some of its children to another node that would in turn result in that node becoming a weak point and would lead to further oscillations of this kind and cause instability.

According to the techniques herein, therefore, the DAG root builds the following lists of nodes: 1) the set of nodes $N_i$ identified as weak points (the Black List); and 2) the set of nodes $N_k$ in the neighborhood (relevant vicinity) of the nodes $N_i$ that may become weak because of redirection of some children of a notified weak point (the Grey List).

According to one or more embodiments herein, the techniques may first specify a newly defined IPv6 unicast message (called P) (probe 740) sent by the DAG root to each node $N_i$ of the set S that comprises:

1) A request to poll $N_i$'s children for alternate acceptable parent(s). In one embodiment, this information could also be available at the node $N_i$ itself as the children can advertise this information in their DAOs.
2) A black list $B=S-N_i$ (the set B may be encoded using a Bloom Filter or other compression technique).
3) A max_cost_increase factor. This is a threshold value used to make sure the path quality/cost stays within a specific bound if a child moves away from the current parent to a new parent.
4) (optionally) A parameter nb_remove that specifies the number of children that a weak point should get rid of in order to not be considered as a weak point.

Figure 8:
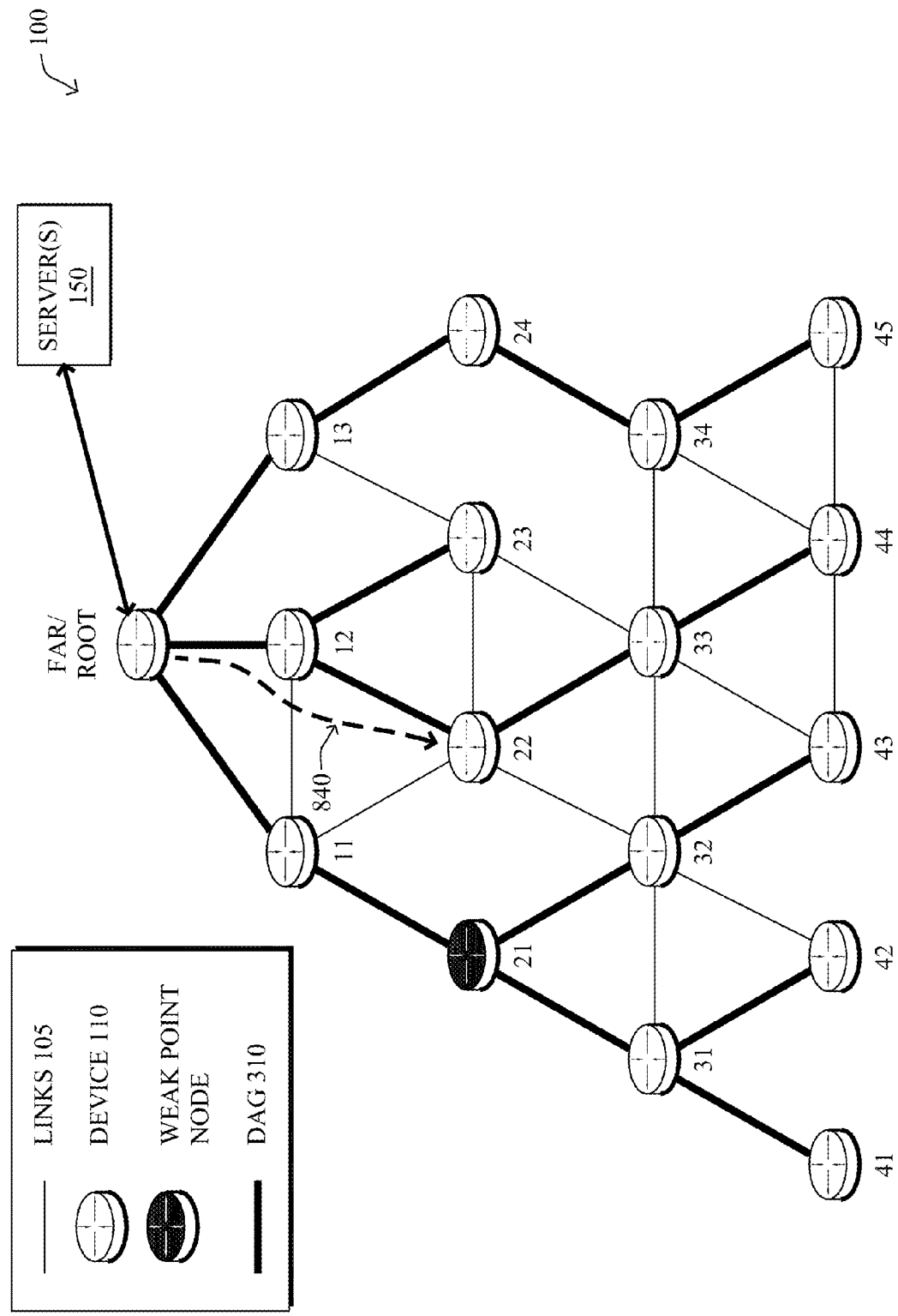
FIG. 8 illustrates an example of an acceptable alternate node instruction.

Next, the techniques herein provide for the DAG root to select a node $N_i$ from the set S, as follows:

Step-1: for each node $N_k$ of the Grey list related to $N_i$, as shown in FIG. 8, the DAG root prepares a newly defined message 840 indicating the maximum new children (nb_admit) that the node could admit (before becoming itself a weak point) and arms a local timer T0; note that this contrasts with current approaches since a grey node is informed by the routing analysis engine of the number of new children that is may accept in order to not become a weak point (information that the grey node cannot get from the distributed routing protocol).

Step-2: after the expiration of the timer T0, the DAG root checks whether the conditions for the nodes in the grey list still hold or not. For all the nodes that still meet the conditions, the DAG root sends the message specified above to the node $N_i$ and arms a local timer T1.

Step-3: upon receiving the "poll" message P (740 in FIG. 7), the node $N_i$ relays the message P (740a in FIG. 7) to each of its children (e.g., after encapsulation in a link local multicast message).

Step-4: call the leaf_weak_function( ) at all the children (described below).

The leaf_weak_function( ) is defined as follows: Upon receiving the message P, each child sends a neighbor solicitation (NS) message in order to determine the set of immediate neighbors; at this point, the algorithm used by the distributed routing protocol for parent selection is called in order to determine the set C of candidate parents that can be selected as new preferred next-hop. Each element in the set C that belongs to the set B (Black list) is removed and the node $N_i$ itself is also removed. Each node that provides a path such that path_cost>current_path*max_cost_increase is removed. The new set C' comprises all acceptable alternate parents that can be used to avoid the weak point, and may be returned in a reply message.

Once directed (e.g., in response to the probe P or explicit message), each of $N_i$'s children (i.e., children of weak points) triggers the following algorithm: Upon receiving the relayed message P (or explicit instruction), each child of $N_i$ first computes the most preferred alternate parent in the set C' (in other words the parent offering the least cost (<current_path*max_cost_increase) that is not listed as a weak point (in the black list).

Also, each node $N_i$ in the set C' computes a timer $T2(N_k)$ which equals new_path_cost*current_path_cost*K*(1/number_of-its-own-Children) (where K is a time-based constant).

The idea of introducing the number of children in the timer is to favor the movement of first level nodes with a small number of children to minimize routing topology change and resultant perturbation. Consequently, a node with a small number of children will move first (shorter timer) and the process will stop as soon as the weak point is no longer considered as a weak point. Moving a small amount of nodes also makes sure a large burst does not make the new parents weak.

Figure 9:
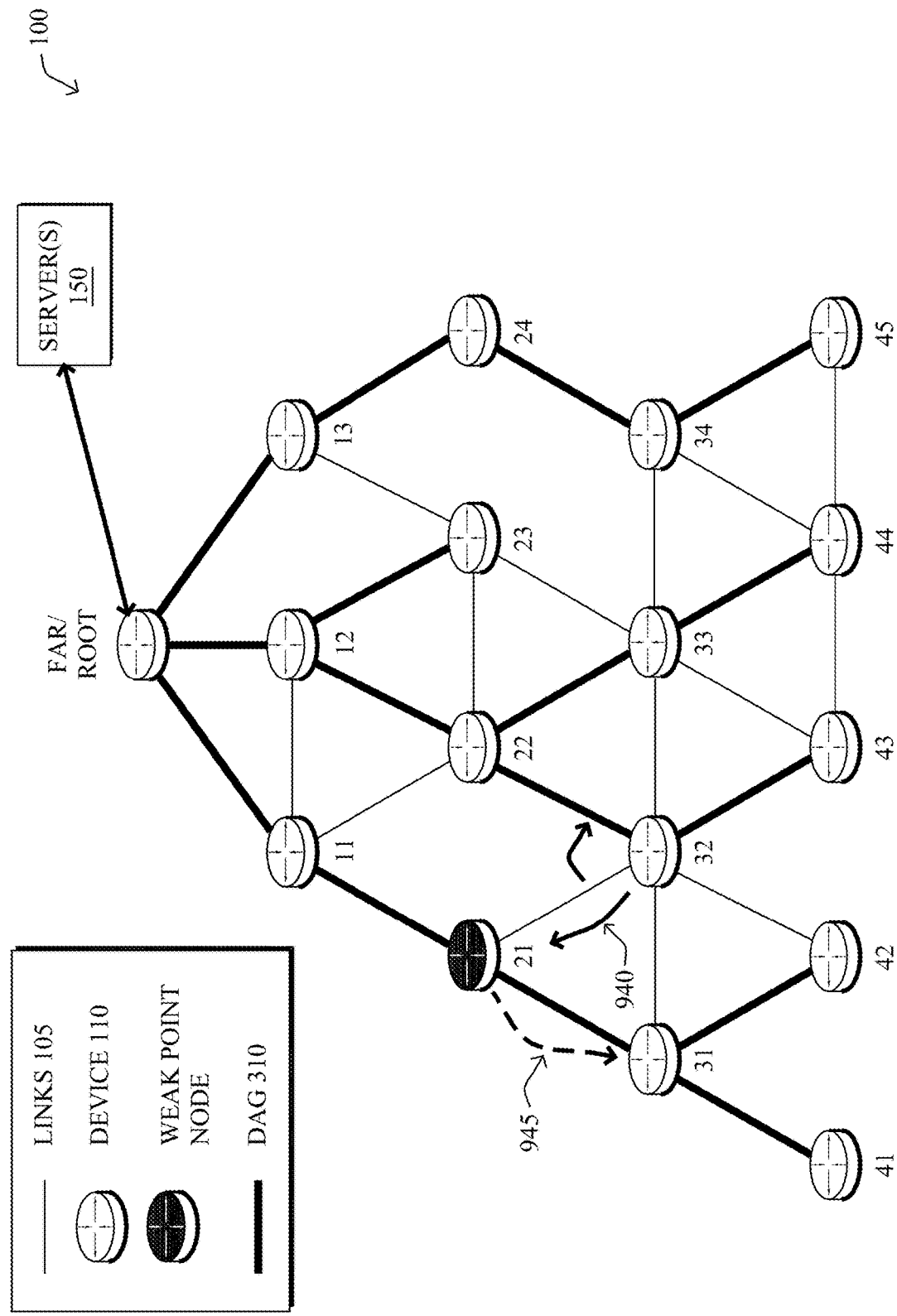
FIG. 9 illustrates an example of rerouting based on weak point nodes.

After the expiration of the timer $T2(N_k)$ the node $N_k$ joins the newly selected parent, as shown in FIG. 9, where node 32 has moved to node 22 (assuming it is not a weak point based on this move). If the newly selected parent rejects the children, then a new alternate parent (if any) is chosen. The rejection mechanism may makes use of a routing admission control mechanism. In general, if a node $N_k$ that has been informed of the maximum number of new children that it can admit, and the new node exceeds this number nb_admit, a message is replied back rejecting the node. In addition, after the expiration of the timer $T2(N_k)$ the node $N_k$ sends a newly defined message R (940) to its current parent $N_i$ indicating that it selected a new preferred parent. The process continues until $N_i$ has received a number of messages R equal to nb_remove, at which point the node $N_i$ sends a newly defined link local multicast message P' (945) indicating to the remaining children that it is no longer a weak point (shown only to node 31, though node 32 may also receive the message 945).

After the expiration of the timer T1 in the algorithm specified above, the set S is re-calculated (since new weak points may have appeared or disappeared) and the procedure is called iteratively until the set S is empty (there are no more weak points) or falls bellow a configurable threshold. Note that T1 may be dynamically computed according to the number of weak points, routing protocol parameters, distance between the DAG root and the weak points, etc.

In yet another embodiment, if the DAG root has visibility on the QoS of the path from each of $N_i$'s children and can determine whether or not alternate acceptable parents can be found (with respect to the SLAs), then a newly defined unicast IPv6 message may be sent to each individual nodes requesting them to select an alternate parent (that may optionally be indicated in the message). For example, a message may be sent to node 33 to select node 23 as a parent, while node 32 selects node 22 as a new parent, thus shifting the network in a manner that distributes traffic to avoid weak point nodes. Note that this mode of operation may be costly in LLNs though. In particular, it is worth pointing out that one may use a fully centralized algorithm whereby the network topology analysis component is responsible for assisted routing and determines which nodes should select another parent. Although such an approach is undoubtedly simpler, it is also significantly more costly especially in terms of control messages. The aim of the distributed approach is to rely on a central analysis of the DAG structure but rely on a fully distributed routing decision process.

Figure 10:
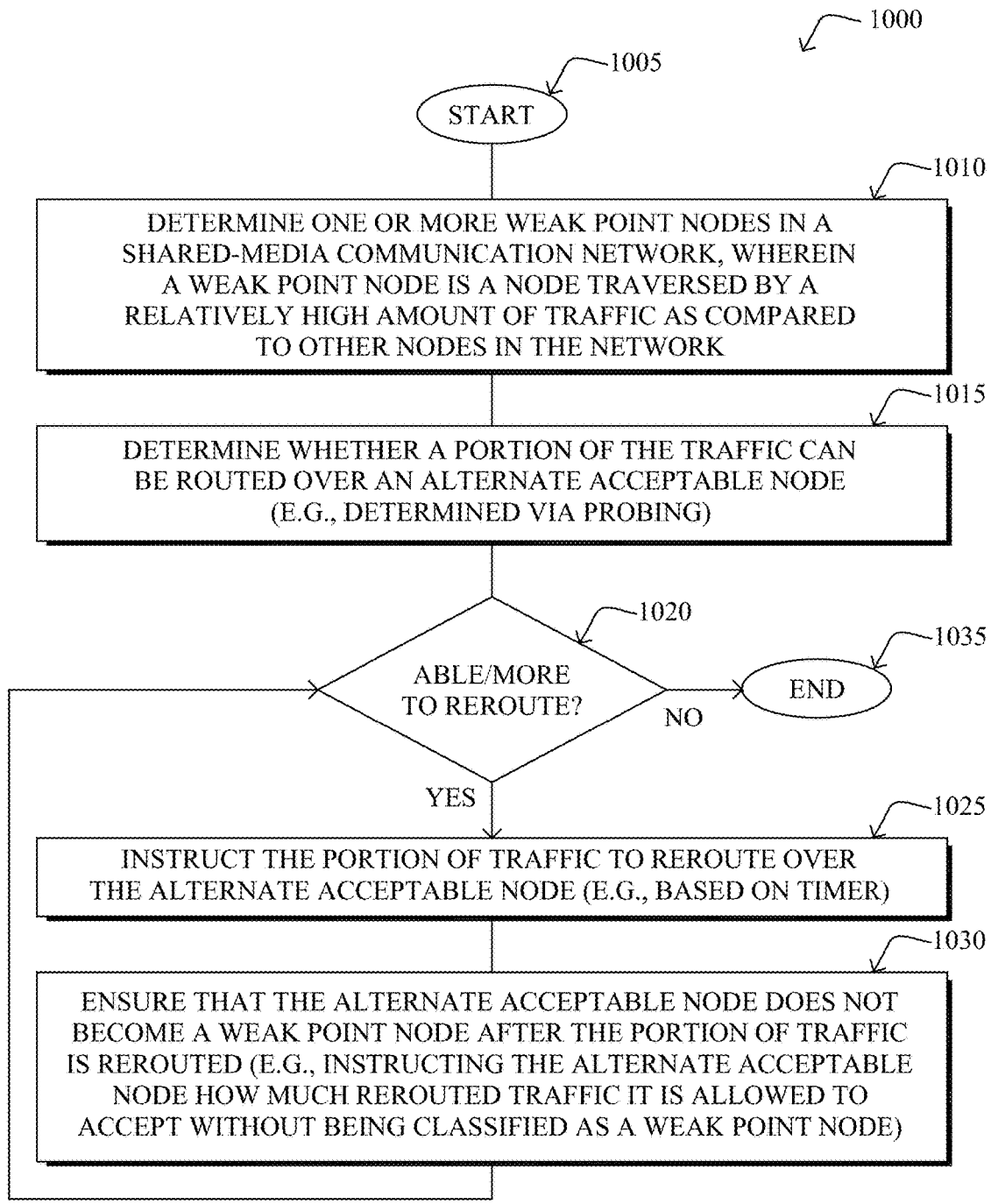
FIG. 10 illustrates an example simplified procedure for a mixed centralized/distributed algorithm for risk mitigation in sparsely connected networks.

FIG. 10 illustrates an example simplified procedure 1000 for a mixed centralized/distributed algorithm for risk mitigation in sparsely connected networks in accordance with one or more embodiments described herein. The procedure 1000 may start at step 1005, and continues to step 1010, where, as described in greater detail above, a management device (e.g., FAR, NMS, etc.) determines one or more weak point nodes in a shared-media communication network, where a weak point node is a node traversed by a relatively high amount of traffic (e.g., actual traffic or based on a number of children) as compared to other nodes in the network. Other considerations may also help in determining a weak point node using an anomaly detection algorithm in addition to the amount of traffic as mentioned above, such as whether the node is at least a certain depth away from a root node of a DAG, whether the traffic is "important" (e.g., based on a traffic characteristic such as traffic type, traffic class, traffic destination address, a DSCP value of the traffic, and so on).

In step 1015, the management device determines whether a portion of the traffic can be routed over an alternate acceptable node. In particular, as described in greater detail above, the management device may determine the alternate acceptable node by probing a subset of nodes within a location from which the traffic originates (e.g., a sub-DAG of a given node, a localized area surrounding the given node, neighbors of the node, etc.), or through other techniques such as knowledge of the network topology. Notably, the alternate acceptable node may also be determined to be acceptable based on characteristics such as its not already being a weak point node, a maximum cost and/or cost increase for using the alternate acceptable node (e.g., between a particular weak point node and the alternate acceptable node), a maximum delay and/or delay increase for using the alternate acceptable node, and a maximum quality decrease (e.g., between a particular weak point node and the alternate acceptable node), etc.

If the determination result in step 1020 is that a portion of traffic can be rerouted, then in step 1025 the management device may instruct the portion of traffic to reroute over the alternate acceptable node as described above. For instance, a particular node (a weak point node) may be directed to instruct its neighbors to reroute over the alternate acceptable node. In one embodiment in particular, the "portion" of traffic may be determined to sufficiently declassify a corresponding weak point node from being a weak point node once the portion of traffic is rerouted (e.g., a number of children to reroute). Note that in step 1030, the management device also ensures that the alternate acceptable node does not become a weak point node itself after the portion of traffic is rerouted, such as by instructing the alternate acceptable node how much rerouted traffic it is allowed to accept without then being classified as a weak point node.

As mentioned above, the portion of traffic instructed to reroute may be rerouted according to a timer, which is based on a number of children of the weak point node's rerouting neighbors. For instance, as illustrated above, the timer may be longer when the number of children is higher, and shorter when the number of children is lower. In this example, it is possible that a particular node may be declassified from being a weak point node before all of the portion of traffic has been rerouted, and as such, rerouting of a remaining portion of traffic for the particular node now declassified from being a weak point node may cease (e.g., per explicit instruction from the management device or the declassified node itself).

The procedure 1000 may iteratively instruct portions of traffic to reroute over alternate acceptable nodes (returning to step 1020) until all possible weak point nodes in the network are declassified from being weak point nodes. At this point, the procedure illustratively ends in step 1035, notably with the option to continue updating a traffic matrix and determining weak point nodes over time. It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a mixed centralized/distributed algorithm for risk mitigation in sparsely connected networks. In particular, the techniques herein allow a DAG root to actively search and track weak points in the topology a posteriori, and use a lightweight mechanism for reinforcing the corresponding portion of the routing tree by using a mechanism to route nodes away from a heavily loaded parent to neighboring parents without affecting the SLA of the traffic (notably accomplished without requiring any modification of the protocol itself). In addition, the techniques herein, particularly the use of an anomaly detection algorithm, are adaptive and autonomic, without adding additional complexity.

While there have been shown and described illustrative embodiments that provide for a mixed centralized/distributed algorithm for risk mitigation in sparsely connected networks, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
analyzing, by a root node of a direct acyclic graph (DAG) in a shared media communication network, a routing topology associated with the shared-media communication network using distributed intelligence to identify a set of weak point nodes in the DAG that:
1) are not in an immediate neighborhood of the root node, but still attract an amount of traffic that is relatively high compared to other nodes in the network, and
2) are traversed by traffic classified as important;
determining, by the root node, whether a portion of the traffic can be routed over an alternate acceptable node; and
if so, instructing, by the root node, the portion of traffic to reroute over the alternate acceptable node.

2. The method as in claim 1, further comprising:
instructing the alternate acceptable node how much rerouted traffic it is allowed to accept without being classified as a weak point node of the set of weak point nodes.

3. The method as in claim 1, wherein instructing comprises:
directing a particular node to instruct neighbors of the particular node to reroute over the alternate acceptable node.

4. The method as in claim 1, wherein a weak point node of the set of weak mode nodes is a node at least a certain depth away from the root node.

5. The method as in claim 1, wherein the amount of traffic of a particular weak point node of the set of weak point nodes is based on actual traffic traversing the particular weak point.

6. The method as in claim 1, wherein the amount of traffic of a particular weak point node of the set of weak point nodes is based on a number of children of the particular weak point node in the DAG.

7. The method as in claim 1, wherein traffic is classified as important based on a traffic characteristic selected from a group consisting of: traffic type; traffic class; traffic destination address; and a differentiated services code point (DSCP) value of the traffic.

8. The method as in claim 1, wherein determining the set of weak point nodes comprises applying an anomaly detection algorithm.

9. The method as in claim 1, further comprising:
determining the alternate acceptable node by probing a subset of nodes within a location from which the traffic originates.

10. The method as in claim 1, further comprising:
ensuring that the alternate acceptable node does not become a weak point node of the set of weak point nodes after the portion of traffic is rerouted.

11. The method as in claim 1, wherein the alternate acceptable node is determined to be acceptable based on characteristics selected from a group consisting of: the alternate acceptable node not already being a weak point node of the set of weak point nodes; a maximum cost increase between a particular weak point node of the set of weak point nodes and the alternate acceptable node; a maximum cost for using the alternate acceptable node; a maximum delay increase between a particular weak point node of the set of weak point nodes and the alternate acceptable node; a maximum delay for using the alternate acceptable node; and a maximum quality decrease between a particular weak point node of the set of weak point nodes and the alternate acceptable node.

12. The method as in claim 1, further comprising:
determining the portion of traffic to sufficiently declassify a corresponding weak point node from being a weak point node of the set of weak point nodes once the portion of traffic is rerouted.

13. The method as in claim 1, further comprising:
iteratively instructing portions of traffic to reroute over alternate acceptable nodes until all possible weak point nodes in the network are declassified from being weak point nodes.

14. The method as in claim 1, wherein instructing comprises:
instructing the portion of traffic to reroute according to a timer based on a number of children of neighbors of the set of weak point nodes, wherein the timer is longer when the number of children is higher, and shorter when the number of children is lower.

15. The method as in claim 14, wherein a particular node may be declassified from being a weak point node of the set of weak point nodes before all of the portion of traffic has been rerouted, the method further comprising, in response:
ceasing rerouting of a remaining portion of traffic for the particular node now declassified from being a weak point node of the set of weak point nodes.

16. An apparatus operating as a root node in a direct acyclic graph (DAG) in a shared media communication network, comprising:
one or more network interfaces to communicate with the shared-media communication network;
a processor coupled to the network interfaces and adapted to execute one or more processes; and
a memory configured to store a process executable by the processor, the process when executed operable to:
analyzing a routing topology associated with the shared-media communication network using distributed intelligence to identify a set of weak point nodes in the DAG that:

1) are not in an immediate neighborhood of the root node, but still attract an amount of traffic that is relatively high compared to other nodes in the network, and
2) are traversed by traffic classified as important;
determine whether a portion of the traffic can be routed over an alternate acceptable node; and
if so, instruct the portion of traffic to reroute over the alternate acceptable node.

17. The apparatus as in claim 16, wherein the process when executed is further operable to:
instruct the alternate acceptable node how much rerouted traffic it is allowed to accept without being classified as a weak point node of the set of weak point nodes.

18. The apparatus as in claim 16, wherein a weak point node of the set of weak point nodes is a node at least a certain depth away from the root node, wherein the amount of traffic of a particular weak point node of the set of weak point nodes is based on a number of children of the particular weak point node in the DAG.

19. The apparatus as in claim 16, wherein the process when executed is further operable to:
determine the alternate acceptable node by probing a subset of nodes within a location from which the traffic originates.

20. The apparatus as in claim 16, wherein the process when executed is further operable to:
ensure that the alternate acceptable node does not become a weak point node of the set of weak point nodes after the portion of traffic is rerouted.

21. The apparatus as in claim 16, wherein the process when executed to instruct is further operable to:
instruct the portion of traffic to reroute according to a timer based on a number of children of neighbors of the set of weak point nodes, wherein the timer is longer when the number of children is higher, and shorter when the number of children is lower.

22. A tangible, non-transitory, computer-readable media having software encoded thereon, the software when executed by a processor on a root node of a direct acyclic graph (DAG) in a shared media communication network operable to:
analyze a routing topology associated with the shared-media communication network using distributed intelligence to identify a set of weak point nodes in the DAG that:
1) are not in an immediate neighborhood of the root node, but still attract an amount of traffic that is relatively high compared to other nodes in the network, and
2) are traversed by traffic classified as important;
determine whether a portion of the traffic can be routed over an alternate acceptable node; and
if so, instruct the portion of traffic to reroute over the alternate acceptable node.

* * * * *